Feb. 28, 1950
E. J. PATTERSON
2,498,962
NUT CONVEYING AND HOLD-DOWN MEANS
FOR NUT HALVING MACHINES
Filed March 31, 1947
3 Sheets-Sheet 1
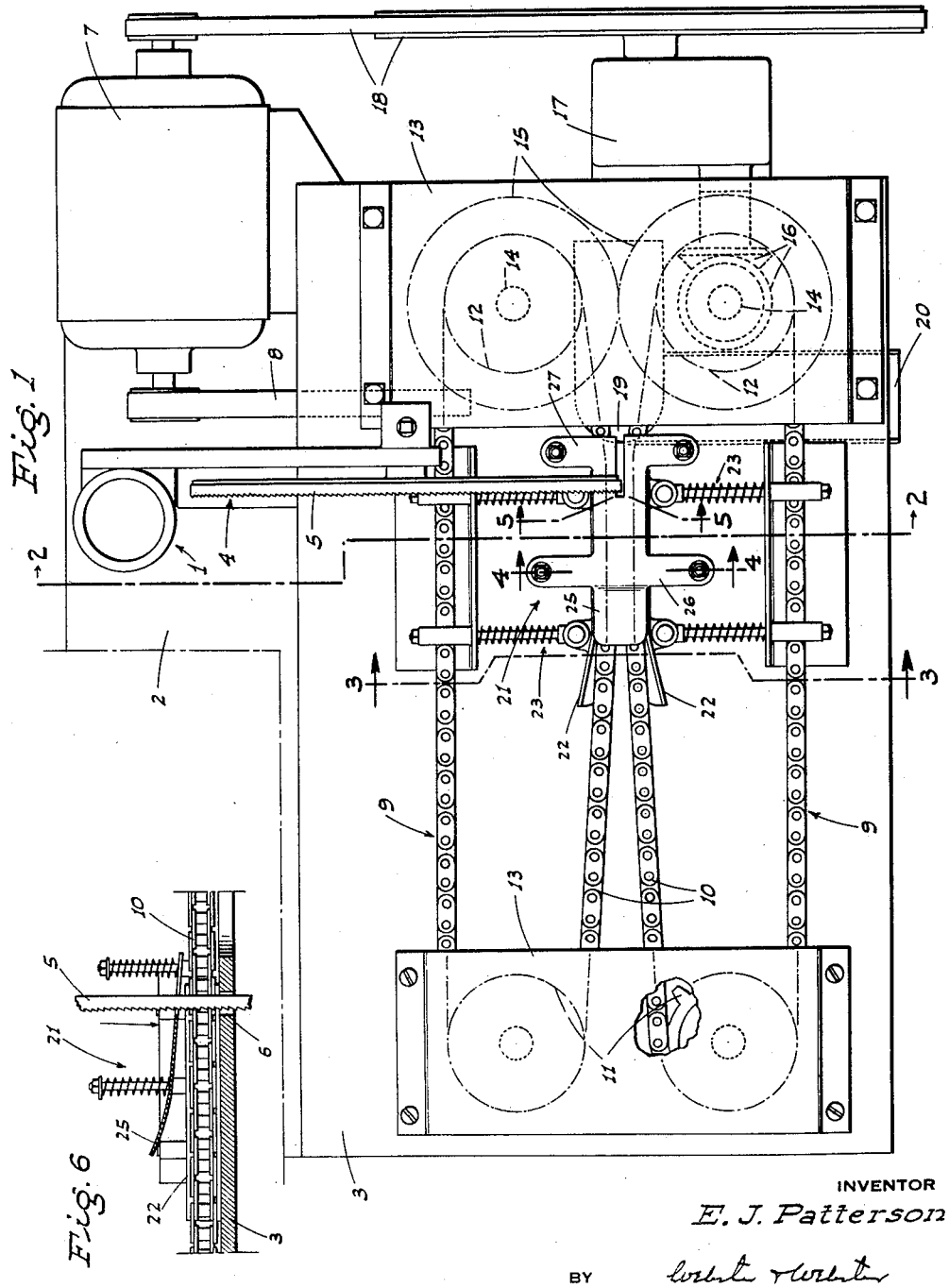
INVENTOR
E. J. Patterson
BY
ATTORNEYS Feb. 28, 1950
E. J. PATTERSON
2,498,962
NUT CONVEYING AND HOLD-DOWN MEANS
FOR NUT HALVING MACHINES
Filed March 31, 1947
3 Sheets-Sheet 2
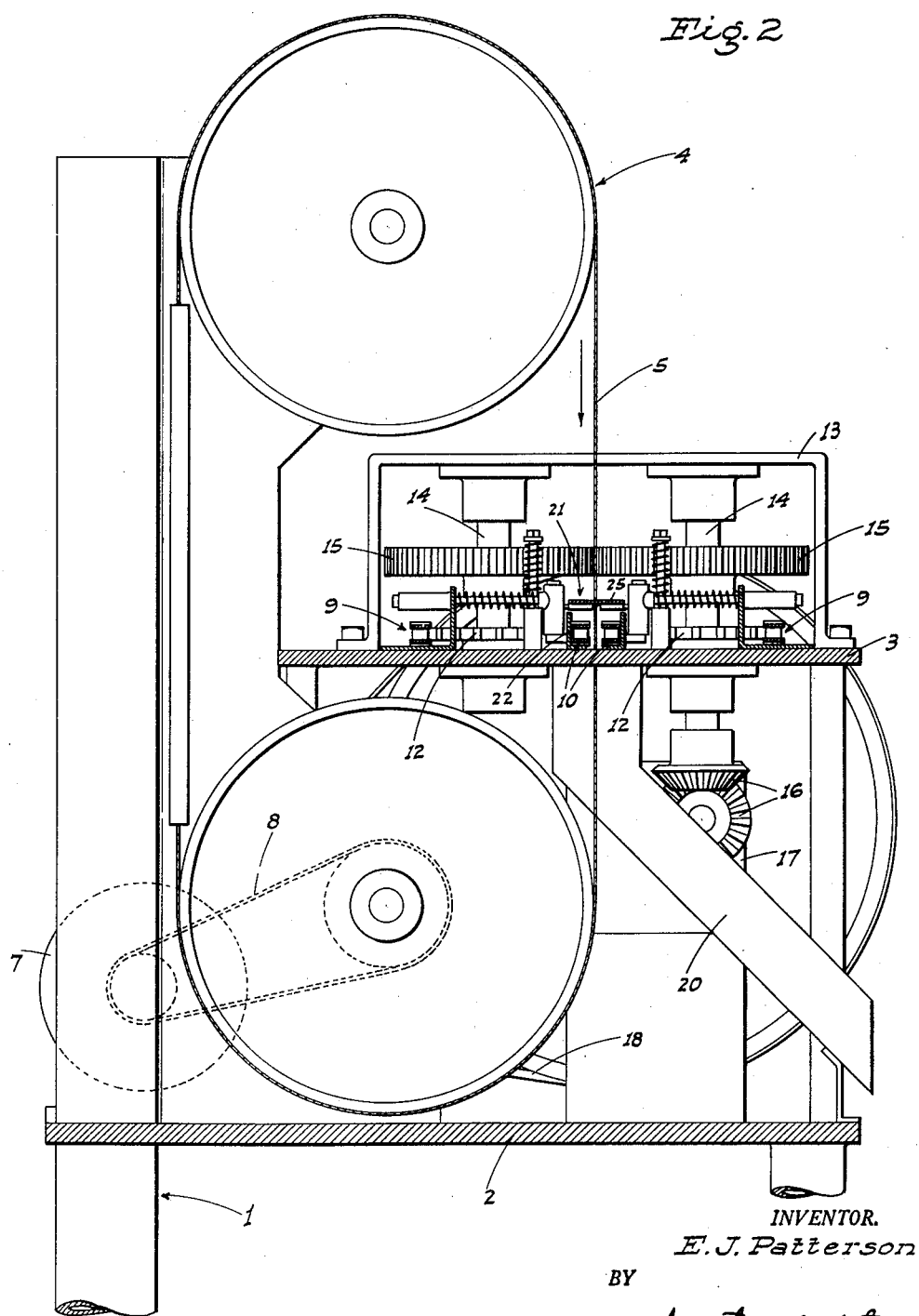
INVENTOR.
E. J. Patterson
BY
Webster & Webster
ATTYS

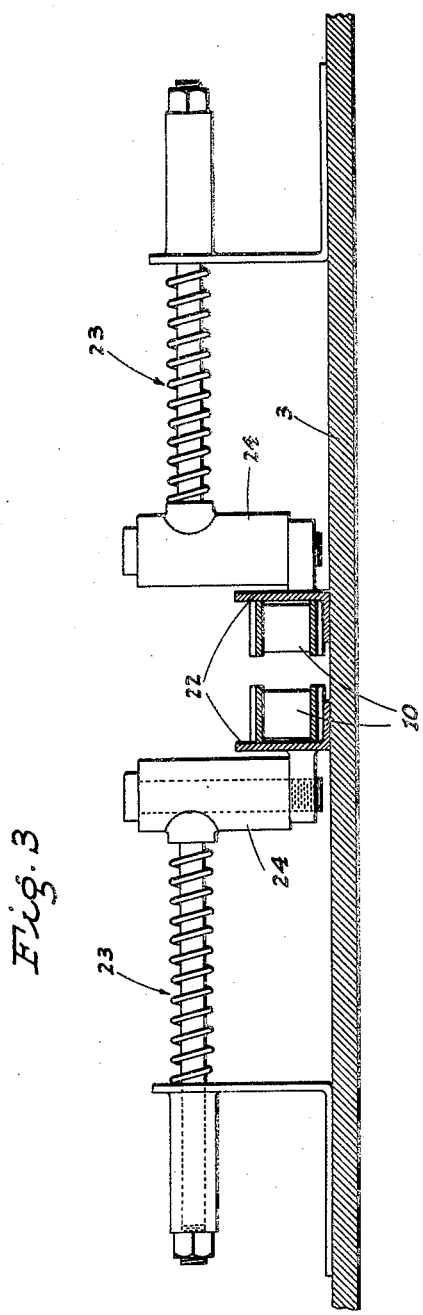
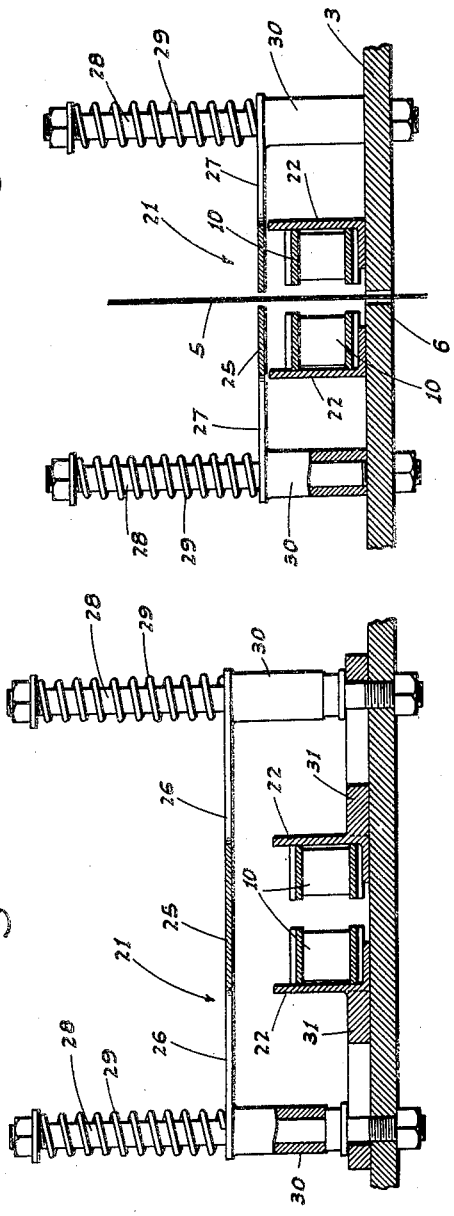

Patented Feb. 28, 1950

2,498,962

UNITED STATES PATENT OFFICE 2,498,962

NUT CONVEYING AND HOLD-DOWN MEANS FOR NUT HALVING MACHINES

Edie J. Patterson, Stockton, Calif.

Application March 31, 1947, Serial No. 738,414

4 Claims. (Cl. 146—72)

This invention is directed to, and it is an object to provide, a novel machine for halving or splitting nuts, such as English walnuts, preparatory to removing the nut meats.

Another object of the invention is to provide a nut halving machine which includes a novel conveyor unit operative to feed the nuts in single file order along a table, and a power saw arranged to cut through the nuts at a predetermined point in said path; the conveyor including a pair of horizontally disposed endless chains between adjacent runs of which the nuts are engaged, and the saw being a bandsaw with an endless blade running vertically between said adjacent runs of the endless chains.

A further object of this invention is to provide a nut halving machine, as above, which embodies a novel hold-down and guide assembly through which the adjacent nut engaging runs of the endless chains travel; such assembly including a top hold-down plate mounted to yieldably bear on the nuts to maintain them against upward displacement from the desired horizontal path of movement, and lateral pressure plates operative to yieldably urge said runs against the nuts from opposite side so that such runs effectively grip the nuts to advance the same.

A further object of the invention is to produce a practical and fast action device and one which will be exceedingly effective for the purpose for which is is designed.

These objects are accomplished by means of such structure and relative arrangement of parts as will fully appear by a perusal of the following specification and claims.

In the drawings:

Fig. 1 is a top plan view with the protective hood removed.

Fig. 2 is a transverse sectional elevation on line 2—2 of Fig. 1.

Fig. 3 is an enlarged fragmentary cross section on line 3—3 of Fig. 1.

Fig. 4 is an enlarged fragmentary cross section on line 4—4 of Fig. 1.

Fig. 5 is an enlarged fragmentary cross section on line 5—5 of Fig. 1.

Fig. 6 is a fragmentary longitudinal sectional elevation taken through the hold-down and guide assembly.

Referring now more particularly to the characters of reference on the drawings, the nut halving machine comprises an upstanding frame 1 including a horizontal platform 2 and a horizontal table 3 disposed above such platform. A bandsaw 4 is mounted on the platform 2 with one vertical run of the saw blade 5 extending through a slot 6 in the table 3. A motor 7 on the platform drives the bandsaw by an endless belt and pulley unit 8.

A pair of endless chains 9 are mounted on the table 3 and includes adjacent runs 10; these chains being carried on end sprockets 11 and 12. Both pairs of the end sprockets are hooded as at 13, and journaled therein. The sprockets 12 are carried on spindles 14 having meshing gears 15 which maintain proper timing or relative travel of such chains.

One of the spindles 14 is driven below the table 3 by a bevel pinion and gear unit 16 actuated by a gear reduction box 17 powered from motor 7 by an endless belt and pulley unit 18.

The vertical run of the saw blade 5, which extends through the table, is disposed between the horizontal runs 10 of chains 9 intermediate the ends of the latter and said blade faces toward the sprockets 11. The chains 9 travel in a direction so that the runs 10 move toward said vertical run of the saw blade.

In operation of the machine the nuts are placed between the adjacent and forwardly conveying runs 10 of chains 9 at a point ahead of the saw blade and thence are frictionally engaged by and with said runs to the blade which cuts centrally therethrough; the runs diverging beyond the saw blade and the halved nuts falling through an opening 19 in the table 3 into a carry-off chute 20.

The nuts are placed lengthwise between the runs 10 with the suture line of such nuts at a right angle to the saw blade whereby the nuts are halved on the proper line for ready removal of the nut meats by a subsequent process.

A hold-down and guide assembly, indicated generally at 21, is mounted on table 3 and cooperates with the chain runs 10 at and ahead of the saw blade; the assembly causing said chain runs 10 to converge into yieldable, frictional engagement with the uncut nuts ahead of the saw blade and to diverge beyond the latter for release of the halved nuts. Also this assembly holds the nuts against upward displacement from the table.

The assembly 21 comprises the following structure:

Longitudinally extending, lateral pressure plates 22 of L shape face each other and engage the chain runs 10 on the outside; such pressure plates laterally slidably resting on the table 3, and each carrying the corresponding run 10 on its lower flange. At their forward ends the lateral pressure plates flare outwardly, as shown in Fig. 1.

Adjacent their front and rear ends, each lateral pressure plate is yieldably urged laterally inwardly by a rod and spring unit 23 which connects to such pressure plate by a swivel sleeve 24. As the chains 9 are somewhat slack the spring urged and guided runs 10 converge toward the pressure plates for the purpose of initial nut engagement, and then maintain substantial parallelism to the saw blade.

Above the pressure plates 22 the assembly 21 includes a hold-down plate 25 which is disposed at a downward slope in the direction of travel of chain runs 10; such hold-down plate being provided with oppositely and laterally projecting front and rear arms 26 and 27 which have table mounted, vertical guide rods 28 extending therethrough. Compression springs 29 on rods 28 above the arms 26 yieldably urge the plate 25 toward the table so as to maintain the nuts against vertical displacement while limit sleeves 30 on the arms below the latter slide on the rods to prevent the plate 25 from striking the moving chain runs 10. The saw blade works through a slot, as shown, in the plate 25.

The lateral pressure plates 22 are held down on the table by guide bars 31 fixed to said plates and extending laterally out therefrom; such bars being slotted and adjacent rods 28 extending therethrough, the corresponding limit sleeves 30 bearing downwardly on such bars in spring urged relation.

Although here omitted for convenience of disclosure, the bandsaw and certain of the working parts are enclosed in a protective housing when the machine is in use.

From the foregoing description it will be readily seen that there has been produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful and upon which Letters Patent is desired:

1. A nut halving machine comprising a table, a pair of driven, endless flexible members mounted on the table horizontally with a pair of the runs thereof in adjacent side by side relation, means to actuate the flexible members so that the adjacent runs travel in the same direction, said runs being adapted to engage nuts therebetween in advancing relation, a saw blade working between said runs to halve nuts as so advanced, and a guide and hold down assembly cooperating with the runs adjacent the saw blade to yieldably urge said runs toward each other and to hold down nuts engaged therebetween; said assembly comprising lateral pressure plates engaging the runs on opposite sides, spring means yieldably urging the lateral pressure plates inwardly, a nut hold down plate disposed above the runs and said lateral pressure plates, longitudinally spaced, laterally outwardly projecting arms on said hold down plate, rods upstanding from the table and projecting through the arms, and compression springs on the rods above and bearing against said arms.

2. A nut halving machine comprising a supporting table, a cutting element movable vertically through the table at a point intermediate the ends of the table, a pair of spaced endless chains movable edgewise along the face of the table and past said point, means to drive the chains, and means to yieldably hold said chains in parallelism as they move past said point, such latter means comprising a pair of L-shaped pressure plates disposed in facing relation and in parallelism with each other and extending from one side of said point to the other, the bottom edges of the chains bearing on the bottom flanges of the plates and the outer faces of the chains bearing on the inner faces of the plates, and yieldable means pressing on the outer faces of the plates.

3. A structure as in claim 2 in which said last named means includes brackets mounted on the table and spaced outwardly from the plates, rods slidable through the brackets, and vertically disposed sleeves on the ends of the rods, such sleeves being swivelly connected with the plates.

4. A structure as in claim 3 including guide bars on the plates, said bars being slidable over the table, and vertically yieldable elements supported upwardly from the table and bearing downwardly against said guide bars.

EDIE J. PATTERSON.

REFERENCES CITED

The following references are of record in the file of this patent:

UNITED STATES PATENTS

| Number | Name | Date |
|---|---|---|
| 1,177,534 | Nicklin | Mar. 28, 1916 |
| 1,424,133 | Johnson | July 25, 1922 |
| 1,766,450 | Ost | June 24, 1930 |
| 1,890,676 | Fox | Dec. 13, 1932 |
| 1,921,238 | Milam | Aug. 8, 1933 |
| 2,235,546 | Ahrndt | Mar. 18, 1941 |
| 2,344,711 | McNutt et al. | Mar. 21, 1944 |